United States Patent Office 3,623,277
Patented Nov. 30, 1971

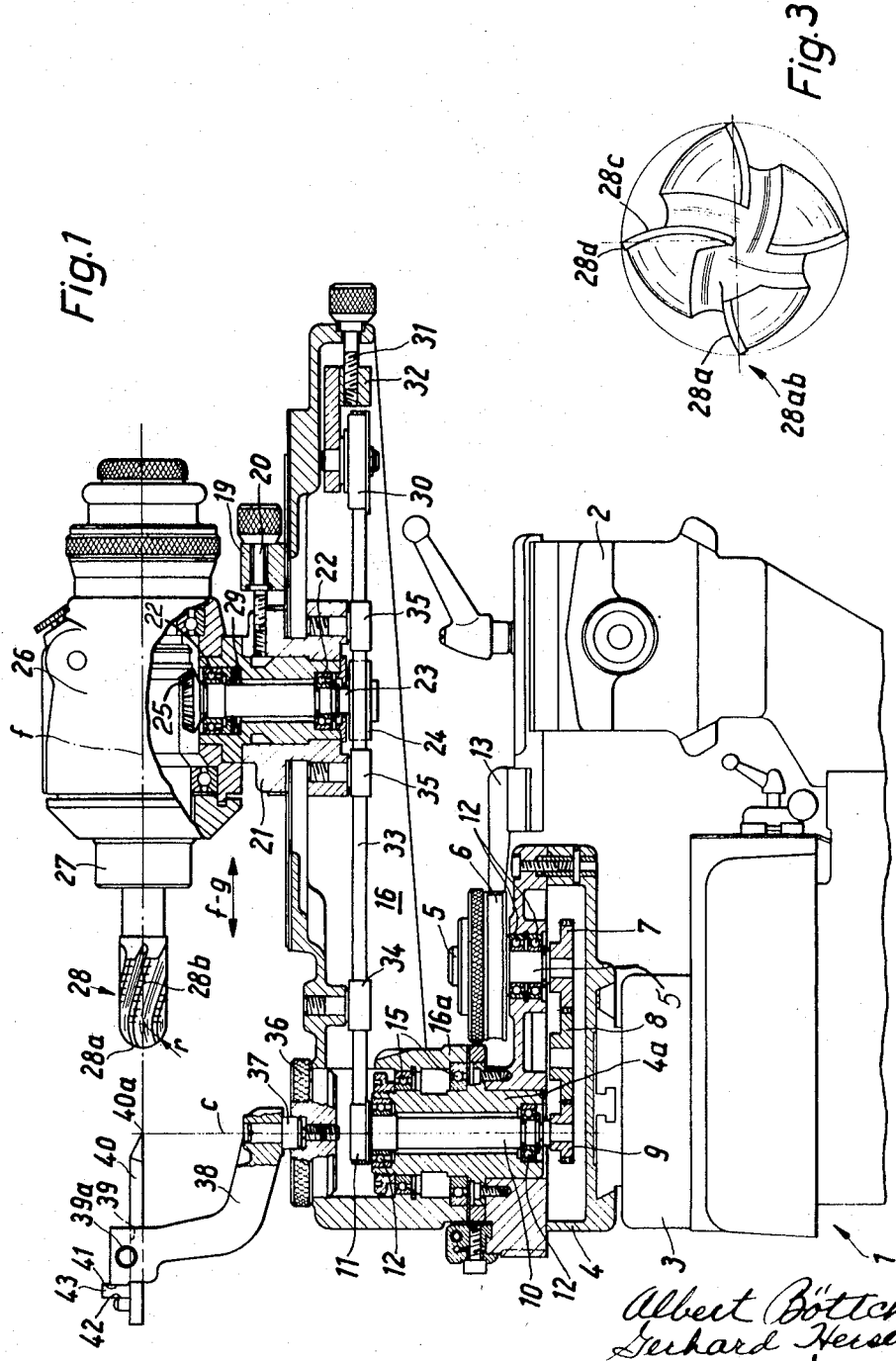

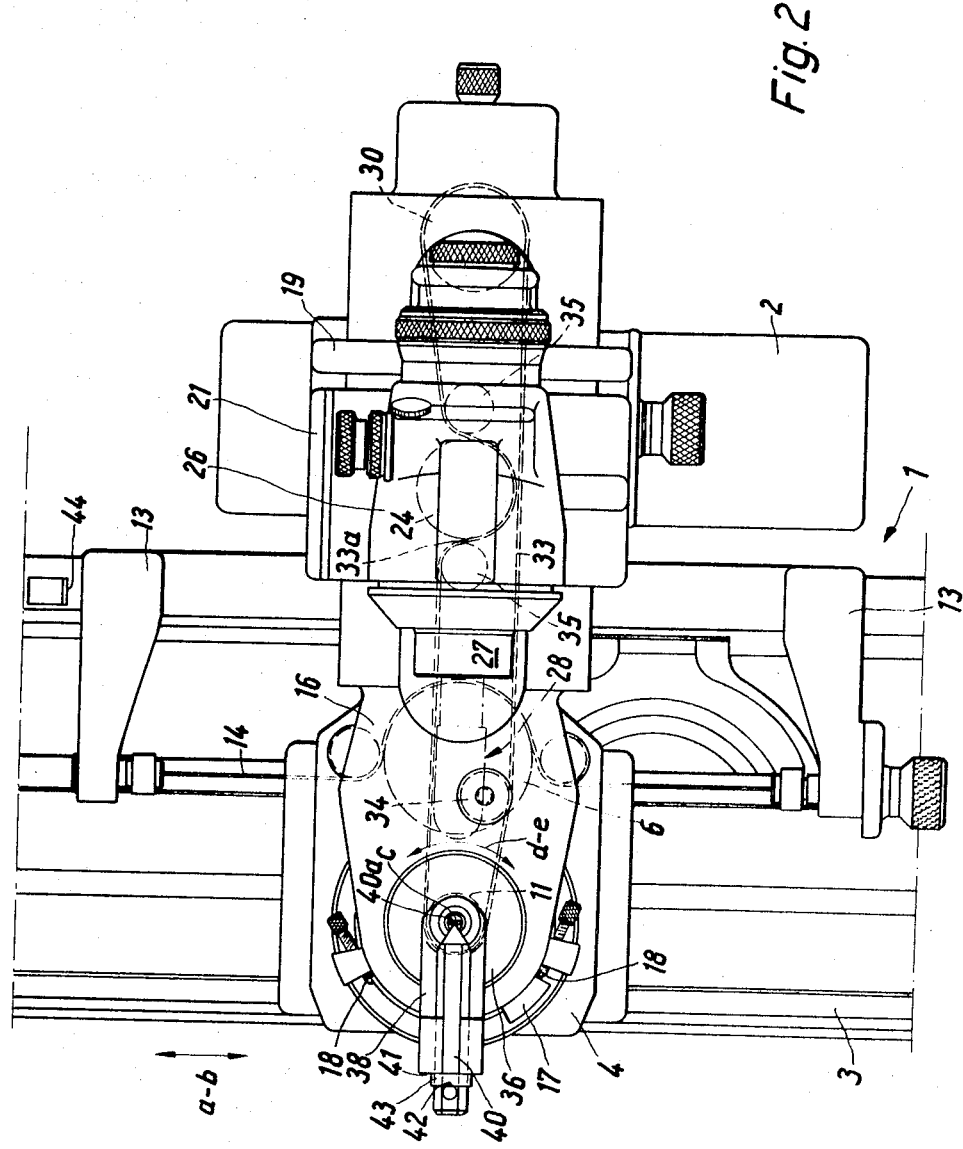

3,623,277
APPARATUS FOR GRINDING VARIOUS SHAPED TEETH ON CUTTER MEMBERS
Albert Bottcher, Scharzfeld, Harz, and Gerhard Hersener, Bad Lauterberg, Harz, Germany, assignors to Franz Kuhlmann KG, Prazisionsmechanik und Maschinenbau, Wilhelmshaven, Germany
Filed July 22, 1969, Ser. No. 843,347
Claims priority, application Germany, July 22, 1968,
P 17 52 828.8
Int. Cl. B24b 3/02
U.S. Cl. 51—225                    7 Claims

ABSTRACT OF THE DISCLOSURE

A device for grinding a die-sinking cutter member such that the cutter teeth change without interruption from a spiral arrangement on the calotte of the cutter member to a helical arrangement on the cylindrical or jacket portion of the member. An indexing head provided with a spindle for receiving the cutter member is adjustably mounted on an arm pivotable on a conventional grinding table, the rectilinear motion of which is transmitted as rotary motion to the spindle on the indexing head through appropriate belt driven shafts. The angle of pivotal movement of the arm is adjusted by means of suitable stops, and upon rectilinear movement of the traveling table, the arm is caused to pivot in addition to transmitting rotary motion to the spindle on the indexing head, with the result that a spherical tooth of the die-sinking cutter positioned on the spindle of the indexing head is led along a conventional grinding wheel in accordance with its initial spiral shape.

---

The invention relates to an apparatus for grinding die-sinking cutter members or the like wherein the cutter teeth change from a spiral arrangement on the calotte portion of the cutter to a coiled or helical arrangement on the cylindrical portion of the cutters. Those teeth whose segments are located on the calotte are to be designated as spherical teeth and those segments located on the cylindrical portion, that is, the jacket surface, are to be designated jacket teeth.

Grinding devices generally employ a driving shaft with a friction wheel and a driven shaft for driving an indexing head whose spindle receives die-sinking cutters to be ground. The shafts, together with associated gearing, are contained in a housing fixed to a grinding table of the grinding machine. The friction wheel is embraced in part by a steel band arranged on a cross slide extending substantially in the direction of travel of the grinding table so that a rectilinear movement of the grinding table is converted into a rotary movement of the driving and driven shafts as well as a rotary movement of the die-sinking cutter. The cutter and its jacket teeth are thus led in a twisted line along a grinding wheel arranged on the grinding spindle of the grinding machine because of the component resulting from the rectilinear travel of the grinding table and the rotary movement of the spindle of the indexing head.

Grinding devices of this kind permit a grinding operation because the driven shaft, with a bevel gear arranged thereon, turns the spindle of the indexing head by means of the movement of the grinding table by the friction drive of the friction wheel of the driving shaft such that a particular jacket tooth located in the grinding position is led in a twisted or coiled line along the grinding wheel clamped on the grinding spindle. Spherical teeth, however, cannot be ground with such a grinding device, both with regard to the cutting face and also the flank. Special grinding procedures and devices are required for this purpose and the sensing operation on the cutter teeth, by means of a supporting finger normally provided for this purpose, requires much training and skill from the grinding operators. Also, considerable difficulties arise with the preparation of a clean (i.e. continuous) transition between spherical teeth and jacket teeth.

The purpose of this invention is to construct a grinding device based on the arrangement described above but which will permit the performance of all grinding operations on a die-sinking cutter, or the like, and eliminate the disadvantages now in existence.

The invention solves the problem above-discussed by arranging the indexing head on an arm which is pivotable on the housing and coaxial with the driven shaft. The indexing head is longitudinally adjustable along the arm and is provided with a spindle whose axis is parallel thereto. The angle of pivoting of the arm is adjustable by means of suitably provided stops or the like. An auxiliary shaft is provided on the indexing head which can be supported in a sliding carriage mounted on the arm. The axis of this auxiliary shaft is parallel to the axis of the driven shaft and connected thereto by means of a steel band drive, independent of the distance between the axes. An increasing or decreasing ratio of transmission may be selected to engage the spindle in a known manner, for example, by means of bevel gears. From a stationary starting position of the grinding table determined by an adjustable stop and through pivoting of the arm by means of the steel band passing around the friction wheel arranged on the driven shaft, the spindle is driven by means of the auxiliary shaft, and the spherical tooth of a die-sinking cutter is thus led along the grinding wheel in accordance with its shape which is spiral at the outset. This arrangement permits a single grinding operation of cutter teeth of a die-sinking cutter or the like with a continuous changing from the spherical teeth to the jacket teeth from the center of the calotte to the end of the jacket portion. This single operation saves numerous unnecessary manipulations and expense with the result that highly qualified grinding operators are no longer required. Consequently, an interruption of the transition between the spherical and the jacket teeth is avoided.

According to a further development of this invention, the drive, which is independent of distance between the aforementioned axes, consists of an endless steel band, or the like, embracing the friction wheel on the driven shaft and a guide wheel fixed in position on the arm with a portion thereof embracing the friction wheel of the auxiliary shaft. This latter shaft is adjustable in the longitudinal direction of the arm and is guided by guide rollers for increasing the looping angle with respect to one of the friction wheels. The guide wheel is adjustable on the arm in the manner of a tensioning roller so that the tension of the steel band can be released and the friction contact between the band and the wheels eliminated. As a result, the wheels may be freely adjusted in relation to each other or be replaced by wheels of different diameters.

Finally, this invention proposes a holder attachable to the driven shaft and equipped with a guide box for a feeler sliding in the axis of the spindle for adjustment of the radius of the calotte of the die-sinking cutter. Mutually facing stops are arranged on the holder and the feeler, and the length of the feeler is so dimensioned that with direct contact of the two stops, the point of the feeler reaches exactly the axis of the driven shaft and also the pivotal axis of the arm. With the introduction of a gage block or blocks, that is, a measuring block between the stops, corresponding to the radius of the calotte, the point of the feeler reaches the radius proper and thus serves to adjust the die-sinking cutter through adjustment of the sliding carriage and indexing head on the arm so that a die-sinking cutter may be adjusted with the greatest precision and in a simple manner before the start of a grinding operation.

Further objects and advantages will become apparent from a reading of the following detailed specification taken in conjunction with the drawing, in which:

FIG. 1 illustrates a device for grinding die-sinking cutters attached to a grinding machine in the direction of travel of the grinding table, in side elevation, and partly in section;

FIG. 2 illustrates the device in plan view; and

FIG. 3 illustrates a die-sinking cutter in front elevation.

According to FIGS. 1 and 2, a housing 4 with a bearing bush 4a is attached to a grinding table 3 of a grinding machine 1 equipped with a cross slide 2 and movable in a straight line direction $a-b$. A driving (main) shaft 5 with a friction wheel 6 is connected to a driven (output) shaft 10 by means of gears 7, 8, 9. Shaft 10 is provided with a friction wheel 11 and is supported by ball bearings 12 defining axes parallel to each other and perpendicular to the direction of travel $a-b$ of grinding table 3.

A steel band 14 attached to cross slide 2 by means of a holder 13 and stretching substantially in the direction $a-b$ of travel of grinding table 3 embraces, in part, friction wheel 6 so that a rectilinear movement of grinding table 3 produces a rotary movement of driving shaft 5 and driven shaft 10. An arm 16, which is pivotable about the axis of driven shaft 10, is provided with stops 17, 18 for determining the angle of pivoting (traverse). The arm 16 is supported by its bearing, bush-like portion 16a on bearing bush 4a of housing 4 by means of ball bearings 15 in such a manner that it is pivotable about axis $c$ of driven shaft 10 in the direction $d-e$ in a plane parallel to the plane of movement of grinding table 3.

A sliding carriage 21 is mounted on arm 16 so as to be capable of sliding along the arm in its longitudinal direction $f-g$ and is adjustable by means of spindle 20 axially supported in a bearing block 19. The carriage 21 houses an auxiliary shaft 23 carried by means of ball bearings 22 defining axes parallel to driven shaft 10. The auxiliary shaft carries at its lower end a friction wheel 24 and at its upper end a bevel gear 25 which engages in a known manner, not illustrated, a corresponding bevel gear of an indexing head 26 supported on sliding carriage 21. Indexing head 26 is attached to carriage 21 in such a manner that the axis of its spindle 27 supporting a die-sinking cutter 28 to be ground is about parallel to the longitudinal axis of arm 16. Auxiliary shaft 23 is spring-loaded in its axial direction by means of a spring 29 for the purpose of maintaining a smooth, free-play engagement of the bevel gears.

A guide wheel 30, whose axis is parallel to that of driven shaft 10, is supported near the free end of arm 16 in a holder or bracket member 32 and is adjustable by means of a spindle 31 supported axially in arm 16. This arrangement allows for tensioning a steel band 33 around friction wheel 11 and guide wheel 30. A strand 33a of the band is engaged by friction wheel 24 acting as a tensioning roller. Further, the looping angles of steel band 33 on friction wheel 11 are increased by means of an auxiliary roller 34 and two guide wheels 35, supported on sliding carriage 21, as well as friction wheel 24, provide a friction drive which is slip-free. Since friction wheel 24 may be adjusted inside the strand of steel band 33 in relation to friction wheel 11 by displacement of carriage 21, an endless band-type of drive is obtained between friction wheels 11 and 24 independent of the distance between their axes.

As shown in FIG. 1, above the bearing bush-like part 16a of arm 16, a seat is provided by means of a bearing plate 36 and a fitted bolt 37 for an attachable holder 38 pivotable about axis $c$ of driven shaft 10, that is, about the pivot of arm 16. The holder 38 is provided with a guide box or housing 39 for a feeler 40 displaceable by sliding in the plane of axis $f$ of spindle 27 of indexing head 26. Guide box 39 may consist of a clamping bearing, or the like, attached by means of a screw 39a. Facing stops 41 and 42 are so arranged on holder 38 and feeler 40, and the length of feeler 40 is so dimensioned, that a tip 40a of feeler 40 reaches exactly to the axis $c$ of driven shaft 10 when a gage block 43 is inserted between stops 41 and 42. If a further gage block corresponding to radius $r$ of the die-sinking cutter 28 is inserted, the radius to be ground can be adjusted exactly. In order to properly set the die-sinking cutter 28, the cutter need only be brought in contact with tip 40a of feeler 40 by adjusting sliding carriage 21 by means of spindle 20. Finally, an adjustable stop 44 is provided on the bed of grinding table 3 for limiting the travel of the grinding table 3.

FIG. 3 shows the approximately spiral shape of cutter teeth 28ab, with cutting face 28c and flank 28d, in the area of the calotte of the die-sinking cutter 28 as the spherical teeth 22a transcend into the jacket teeth 28b, as shown in FIG. 1, in the jacket portion of the cutter 28.

For adjusting the die-sinking cutter 28 to be ground wiht respect to a grinding wheel (not shown), there serves the feeler 40 supported by the removable holder 38. The feeler 40 is, as illustrated in FIG. 1, adjusted by means of the gauge block 43 in such a manner that the point 40a of the feeler 40 is contained in the axis $c$ of the driven shaft 10. By adding a further gauge block which corresponds in dimension to the radius of the die-sinking cutter to be ground, there is obtained a setting in which, when the cutter engages the point 40a of the feeler 40, the center of the curvature of the radius of the cutter calotte lies on the axis $c$. Thereafter, the holder 38, together with the feeler 40, is removed.

Prior to starting the first phase of the grinding operation, the grinding table 3 is brought into a starting position which is determined by means of the adjustable abutment 44.

The first phase of the grinding operation is started by swinging the arm 16 (and thus the indexing head 26) along the arc $d-e$, at which time a spirally extending tooth portion 28a is ground on the calotte. The motion of the cutter resulting in the spiral course of the tooth is achieved by driving the auxiliary shaft 23 through the friction wheel 24 by virtue of the steel band 33 when the indexing head is swung along arc $d-e$. In this manner the spindle 27 and the secured die-sinking cutter 28 are rotated with respect to the grinding wheel in a manner corresponding to the spiral course of the tooth portion 28a. When the pivotal movement of the arm 16 is stopped by the abutment 18, the grinding of the spiral course of a cutter tooth on the cutter calotte is terminated, whereby the arm 16, together with the indexing head 26, is in a position which is 90° with respect to that illustrated in FIG. 2. Phase one of the grinding of one tooth is now completed.

In phase two, for grinding the helical course 28b of the same tooth along the cylindrical portion of the cutter, the grinding table 3 is moved linearly along $a-b$. The rotary motion and the axial feed of spindle 27 necessary for achieving the helical cut of the tooth is imparted to the spindle 27 by the linear motion of the grinding table 3. The axial feed of the spindle 27 is directly effected by the linear displacement of the grinding table, since the axis of the spindle 27, as well as that of the cutter 28, is parallel to the traveling direction $a-b$ of the grinding table. The rotary motion of spindle 27 is caused by the linear motion of grinding table 3 through the following chain of connected transmission components: the steel band 14, the friction wheel 6, the drive shaft 5, the variable ratio gears 7, 8, 9, the driven shaft 10, the friction wheel 11, the steel band 33, the friction wheel 24 and the auxiliary shaft 23.

The aforedescribed two-phase operation results in the grinding of a single tooth. Further teeth are consecutively ground subsequent to consecutive indexing motions of the indexing mechanism.

Each cutter tooth 28ab is thus ground in a single, continuous, two-phase operation and any interruption at the transition between spherical tooth 28a and jacket tooth 28b is thereby avoided. In this connection, the required path of travel, which is spiral at the outset, and then helical, is determined by a suitable selection of the change or variable ratio gears 7, 8, 9, the diameter of friction wheels 6, 11 and especially 24, as well as the selection and adjustment of indexing head 26 so that an adaptation to various shapes of cutter teeth 28ab and die-sinking cutters 28, or the like, is possible.

That which is claimed is:

1. In a device for use with a grinding wheel for grinding a die-sinking cutter to obtain thereon a plurality of teeth each having an initial spiral course on the hemispherical portion or calotte of said cutter and a helical course on the cylindrical portion thereof, the combination comprising,
    (a) a grinding table mounted for rectilinear movement,
    (b) adjustable stop means for varying the length of said rectilinear movement,
    (c) housing means affixed to said grinding table,
    (d) a longitudinal arm pivotally secured to said housing means and having a pivotal axis,
    (e) adjustable stop means for limiting the angle of pivotal movement of said longitudinal arm,
    (f) an indexing head secured to said longitudinal arm at a location remote from the pivotal axis thereof,
    (g) a spindle associated with said indexing head for holding said cutter to be ground,
    (h) adjustable means for displacing said indexing head towards and away from said pivotal axis of said longitudinal arm,
    (i) a rotary auxiliary shaft held on said longitudinal arm and connected to said spindle to rotate the latter,
    (j) first transmission means connecting said longitudinal arm with said auxiliary shaft to impart a rotation to the latter and to said spindle when said longitudinal arm is swung about said pivotal axis for effecting a grinding of said initial spiral course of a tooth,
    (k) a driven shaft held in said housing means coaxially with the pivotal axis of said longitudinal arm and connected to said first transmission means,
    (l) a drive shaft held in said housing means spaced from said driven shaft,
    (m) second, variable ratio transmission means connecting said drive shaft with said driven shaft, and
    (n) third transmission means connecting said grinding table with said drive shaft to impart a rotation to the latter, to said driven shaft through said second transmission means and to said spindle through said auxiliary shaft and said first transmission means when said grinding table is linearly displaced for effecting a grinding of said helical course of the same cutter tooth subsequent to grinding said spiral course thereof.

2. A device according to claim 1, wherein said first transmission means is an endless steel band; said auxiliary shaft has a friction wheel thereon for engaging a portion of said endless steel band, whereby the drive motion between said driven shaft and said auxiliary shaft is maintained independent of the distance between the axes of said driven shaft and said auxiliary shaft.

3. A device according to claim 2, wherein said endless steel band is guided around said friction wheel of said auxiliary shaft by means of a pair of guide rollers for increasing the loop angle of said band around said friction wheel.

4. A device according to claim 2, wherein said endless steel band has a portion thereof engaging a guide wheel, said guide wheel being adjustably mounted on said longitudinal arm for adjusting the tension in said band.

5. A device according to claim 1, wherein there is further provided a holder member removably mounted on said driven shaft, said member having a guide housing and a feeler member slidably supported by said housing along the axis of said spindle whereby the radius to be ground of the calotte of said cutter member may be adjusted.

6. A device according to claim 5, wherein stop members are provided on said holder for receiving therebetween a gage block means, whereby the length of the feeler may be adjusted so that the tip thereof reaches the axis of said driven shaft.

7. A device according to claim 6, wherein a second gage block means corresponding to the radius of the said calotte of said cutter member is inserted between said stop members, whereby said point of said feeler member is withdrawn from said axis of said driven shaft a distance equal to said radius, and the radius to be ground on said cutter member may be adjusted by adjusting said indexing head along said longitudinal arm member to contact said cutter member with said point of said feeler member.

References Cited

UNITED STATES PATENTS

| | | | |
|---|---|---|---|
| 2,998,678 | 9/1961 | Belock | 51—123 X |
| 3,114,988 | 12/1963 | Garrison | 51—124 X |
| 2,449,179 | 9/1948 | Scharping | 51—225 X |

HAROLD D. WHITEHEAD, Primary Examiner

U.S. Cl. X.R.

51—124